Figure 4:
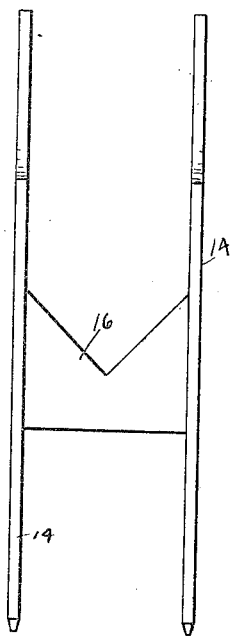

T. W. FORSTER.
BREAD CUTTER.
APPLICATION FILED OCT. 26, 1914.
1,207,525.
Patented Dec. 5, 1916.
2 SHEETS—SHEET 1.
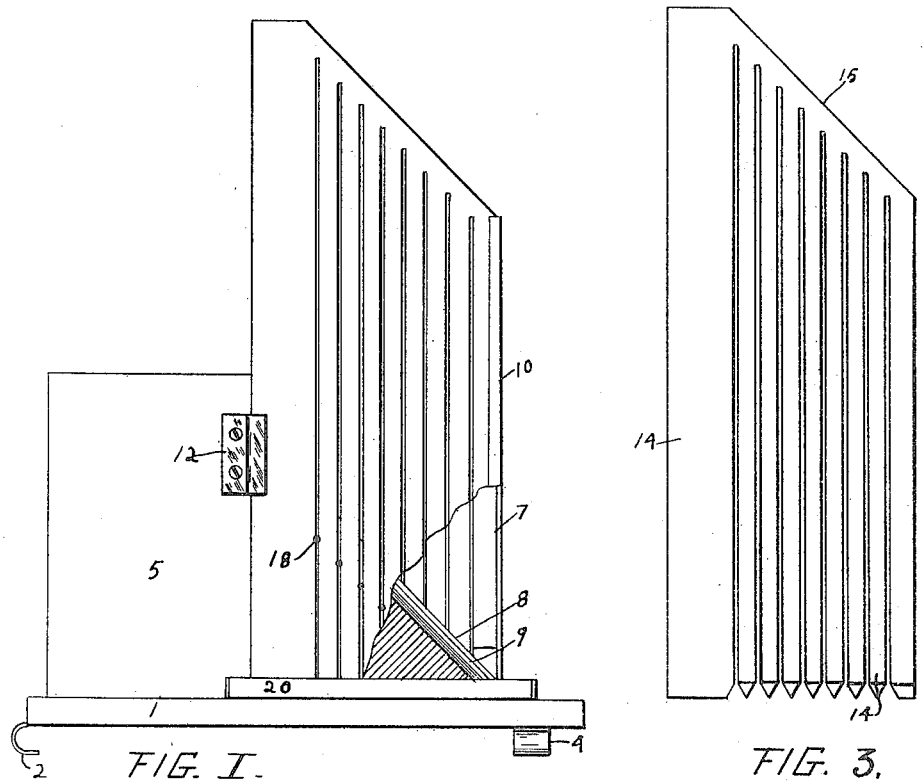
FIG. 1.
FIG. 3.
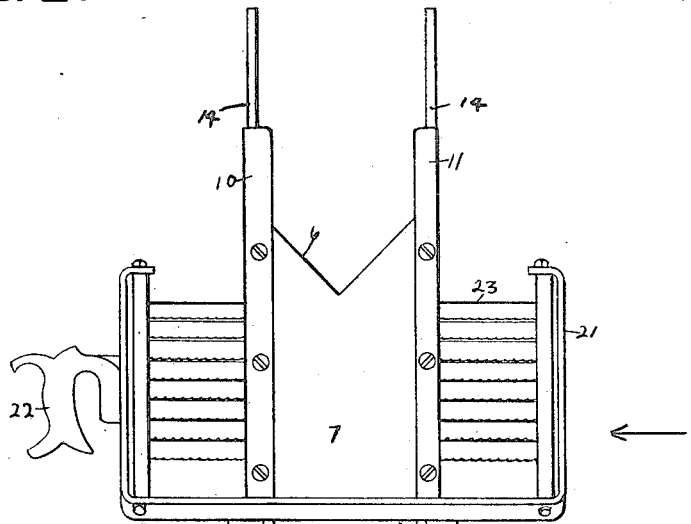
FIG. 2.
WITNESSES:
INVENTOR.
T. W. FORSTER.
BY
Carlos P. Griffin ATTORNEY

T. W. FORSTER.
BREAD CUTTER.
APPLICATION FILED OCT. 26, 1914.

1,207,525.

Patented Dec. 5, 1916.
2 SHEETS—SHEET 2.

WITNESSES:
A. H. Kephart
C. L. Brown

INVENTOR.
T. W. FORSTER.
BY
Carlos P. Griffin ATTORNEY

UNITED STATES PATENT OFFICE.

THOMAS W. FORSTER, OF SAN BRUNO, CALIFORNIA.

BREAD-CUTTER.

1,207,525.          Specification of Letters Patent.          Patented Dec. 5, 1916.

Application filed October 26, 1914.   Serial No. 868,787.

*To all whom it may concern:*

Be it known that I, THOMAS W. FORSTER, a subject of the King of Great Britain, residing at San Bruno, in the county of San Mateo, State of California, have invented a new and useful Bread-Cutter, of which the following is a specification in such full and clear terms as will enable those skilled in the art to construct and use the same.

This invention relates to a bread cutter and is an improvement on the bread cutter shown in United States Patent No. 1,031,111, granted to me July 2, 1912.

An object of the present invention is to improve the support for the loaf to enable the knives to be thinner without danger of cutting into the guides or supports.

Another object of the invention is to provide a guide for the knives above and while cutting through the loaf, thereby insuring the correct slicing of the bread in all parts of the slice.

A further object of the invention is to provide means whereby the guides and supports connected therewith may be removed from the fixed cutting block.

Another object of the invention is to produce a machine in which it is not possible for the knife edge to come into contact with anything except the bread.

Another object of the invention is to provide means whereby the apparatus will be self-cleaning, the crumbs working down into the guide ways rolling out of the cutter through a groove in the machine.

Other objects of the invention will appear as the description proceeds.

An embodiment of the invention is shown in the drawing in which the same reference numeral is applied to the same portion throughout, but I am aware that there are many modifications thereof.

Figure 5:
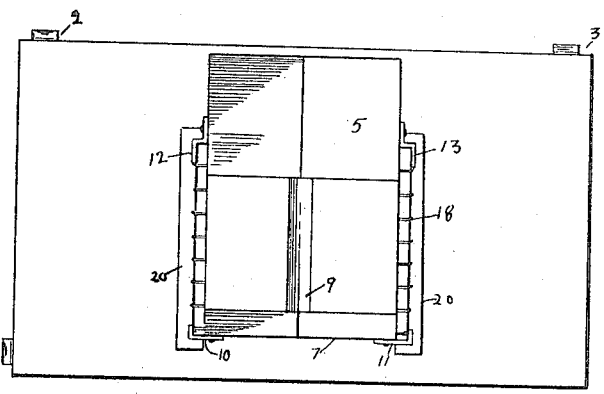
Figure 7:
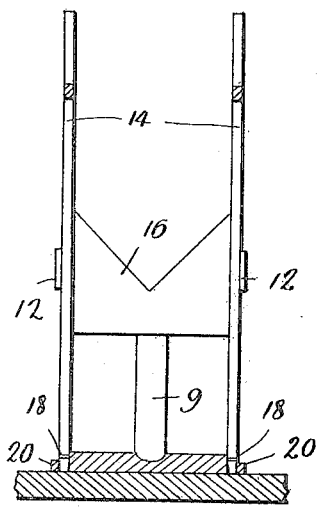
Figure 6:
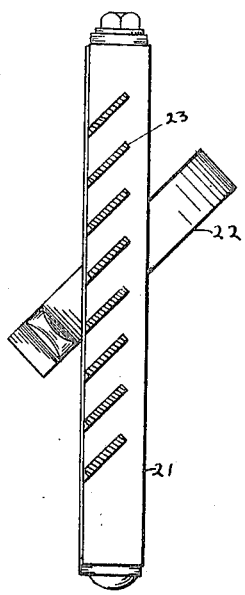

Figure 1 is a side elevation of the cutting block with portions thereof broken away for purposes of illustration, Fig. 2 is an end elevation of the cutting block showing the knife in place therein, Fig. 3 is a side elevation of the guide member removed from the cutting block, Fig. 4 is an edge elevation of the guide member removed from the cutting block, Fig. 5 is a plan view of the cutting block with the guides removed therefrom, Fig. 6 is a transverse sectional view of the knife looking in the direction of the arrow on Fig. 2, and Fig. 7 is a vertical sectional view of the machine with only a portion of the base being shown looking from the right Fig. 1.

The numeral 1 represents a base board having two hooks 2 and 3 on one side thereof and a similar hook 4 on one end, the object being to enable the user to place the cutting board on the corner of a table and have the cutting board firmly held in position. Near the center of the base board there is an upwardly extending block 5, said block having a V shaped trough in the top thereof in the same plane as the V shaped notch 6 in the end board 7. From the bottom of the V shaped trough 6 in the block 5 the block is cut away on an incline as indicated at 8 in Fig. 1 and in the center thereof it has a deep channel 9 for the purpose of directing the crumbs which work into the guide ways below the cutting support to the center and bottom of the cutting machine, from which place they gradually work out of the machine at the notch 9' at the bottom of the board 7. The end board 7 is provided with two plates 10 and 11, which plates form stops for the end of the loaf as well as guides for the knife guides. The block is also provided with two cleats 12 and 13 on the opposite side of the block for the purpose of holding the knife guides in their proper position.

The knife guides consist of two series of bars 14 joined together along their upper ends as indicated at 15 and connected by means of a series of cross pieces 16 having their upper edges provided with a V notch the same as the notch in the board 7 and block 5, the object being to provide a continuous support for the loaf when it is to be cut. On the sides the block has two series of pins 18, which pins hold the guide bars 14 at a fixed distance apart to insure the free working of the knives. At the bottom of the block 5 and on each side thereof there is a cleat 20 forming a pocket for the lower ends of the guide bars 14 when the same have been placed in position.

The knife consists of a U shaped frame 21 having a handle 22 at one end thereof and which frame has a series of knives 23 connected therewith placed at such an angle to the frame as will bring the knives in the proper position for cutting the bread, that position being determined by the width of the knife blades. The knives may be secured in the frame in any suitable manner and may be of any desired form, although a knife with a serrated blade has been illustrated.

In operation the knife guides are assembled upon the support with the auxiliary supports over the inclined runway and substantially in the same horizontal plane as the top of the main supporting block. A loaf of bread is then placed in the V shaped groove formed by the top of the main block and the auxiliary supports, the knife frame then being above the loaf. The knife is thereupon brought down upon the loaf with a slicing motion until the cut has been completed, whereupon the slices may be removed from the machine and the position of the loaf changed to make a fresh cut. When the crumbs from the cutting operation work down into the slides between the auxiliary supports they will fall on the inclined runway and will not accumulate to interfere with the operation of the knives.

It will be observed that an advantage of this machine lies in the fact that at all times are the knife guides against the knives. The guides are attached to the supports. Therefore, there is no danger of said guides giving from side to side and allowing the knives to cut into said supports as sometimes happened when the knives are not so attached, or as the knives sometimes would in the patent referred to herein.

Having thus described my invention what I claim as new and desire to secure by Letters Patent of the United States, is as follows, modifications within the scope of the claims being expressly reserved:

1. A cutting device comprising a support, a slotted guide detachably secured to the support, said guide carrying supports in the same plane as the first support, and stops for determining the position of the object to be cut when it is placed on the supports.

2. A cutting device comprising a support, a plurality of guide bars detachably secured to the support, a plurality of other supports connecting the guide bars and level with the first support, said guide bars extending above the several supports, and stops for determining the position of the object to be cut when placed upon the supports.

3. In a cutting device, a support having an inclined run-way, a plurality of guide bars detachably secured to the support over the inclined run-way, a plurality of additional supports carried by the guide bars in substantially the same plane as the top of the support, and stops for determining the position of the object when placed on the supports.

4. In a cutting device, a support having an inclined runway, a plurality of guide bars detachably secured to the support on each side thereof, and a plurality of other supports over the inclined runway spaced away from each other and connected at their ends with the several guide bars one support for each pair of guide bars.

5. In a cutting device, a support having an inclined run-way, a plurality of guide bars detachably secured to the support on each side thereof adjacent the inclined run-way, other supports carried by the guide bars over the inclined run-way, and stops for determining the position of the object to be cut when placed on the supports.

6. In a cutting device, a support having an inclined runway, a frame detachable from the support and having a plurality of guide bars extending above the same, a plurality of other supports over the inclined runway carried by said guide bars, and a knife frame having a plurality of knives in the slots formed by said guide bars.

7. In a cutting device, a support having an inclined run-way, a frame carrying a plurality of guide bars detachably secured to the support adjacent said inclined runway, a plurality of additional supports carried by the guide bars over the run-way, stops for determining the position of the article to be placed upon the support, and a knife frame carrying a plurality of knives one for each slot between the guide bars.

8. In a cutting device, a support, a frame carrying a double set of guide bars, each set being connected together along the top thereof and detachably secured to the support, a plurality of cross supports connecting the pairs of guide bars, pockets into which the lower ends of the guide bars are inserted, means to hold said guide bars at a fixed distance apart adjacent their lower portion, and stops for determining the position of the article to be placed upon the supports.

9. In a cutting device, a support having an inclined run-way, two sets of guide bars secured together at their upper ends detachably secured to the support over the runway, other supports connecting pairs of guide bars and having their upper surfaces in the plane of the first support, a stop for determining the position of the article to be placed upon the supports, and a knife frame carrying a plurality of knives, one for each slot between the guide bars.

10. A cutting device comprising a support, a plurality of guide bars detachably connected therewith, a pair of bars on each side of the support, and auxiliary supports connecting said bars in the plane of the first support.

In testimony whereof I have hereunto set my hand this 17" day of Oct. A. D. 1914, in the presence of the two subscribing witnesses.

THOMAS W. FORSTER.

Witnesses:
C. P. GRIFFIN,
L. H. ANDERSON.